Nov. 25, 1924.

J. J. WALSH 1,517,224

HOSE COUPLING

Filed Dec. 26, 1923

WITNESSES

INVENTOR
James J. Walsh
BY
ATTORNEYS

Patented Nov. 25, 1924.

1,517,224

UNITED STATES PATENT OFFICE.

JAMES JOSEPH WALSH, OF BROOKLYN, NEW YORK.

HOSE COUPLING.

Application filed December 26, 1923. Serial No. 682,741.

*To all whom it may concern:*

Be it known that I, JAMES J. WALSH, a citizen of the United States, and a resident of the city of New York, borough of Brooklyn, in the county of Kings and State of New York, have invented a new and Improved Hose Coupling, of which the following is a full, clear, and exact description.

This invention has relation to a hose coupling and has particular reference to a safety attachment for coupling a gas hose to a valved outlet nozzle whereby in event of accidental disconnection of the hose from the nozzle the valve will be moved to a closed position for preventing the escape of the gas.

As a further object the invention contemplates an attachment for a gas hose which serves to lock the valve in a closed position against accidental or casual movement to an open position, and which further functions to prevent a small child from manipulating the valve to open the same.

As a still further object the invention aims to provide an attachment of the character set forth which is comparatively simple in its construction, inexpensive to manufacture, which may be readily installed, and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1:
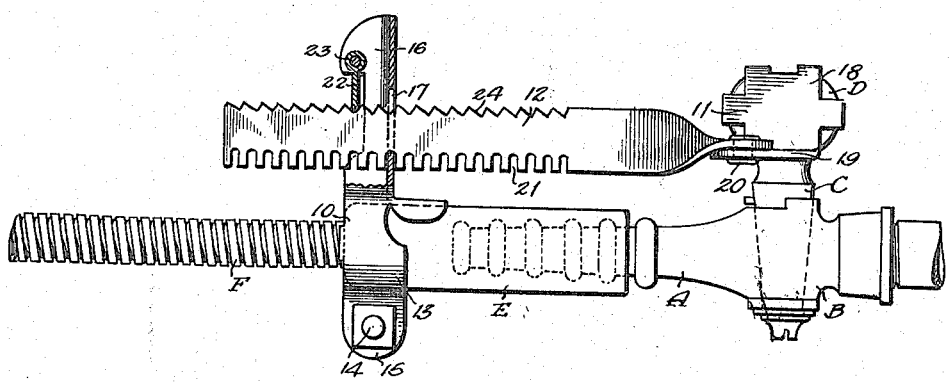
Figure 1 is a side view of the device in applied position, parts being broken away and shown in section.
Figure 2:
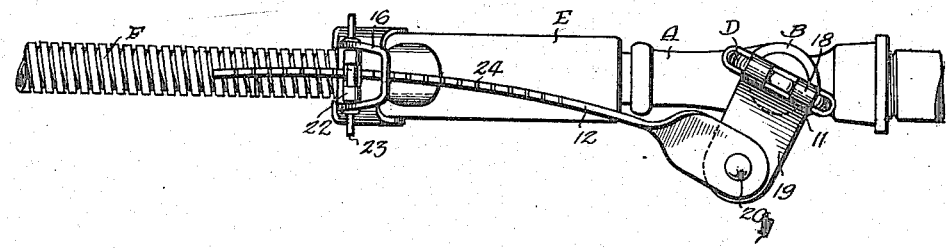
Fig. 2 is a plan view thereof.

Referring to the drawings by characters of reference, A designates an outlet nozzle provided with a controlling valve B having the usual valve core C and manipulating key D. The nozzle A is adapted to receive thereover the end E of a gas hose F.

The attachment constituting the invention consists of a member 10 which is rigidly secured to the hose end E and a member 11 which is engaged with the key D of the valve core and has pivotally attached thereto a rack bar 12 which is interengageably associated with the member 10 coupling the key and hose together whereby when the valve is in closed position the same is locked against accidental or casual movement to open position and whereby said device further functions as a means when the valve is open to close the same in event of accidental disconnection of the hose end E from the outlet nozzle A. The specific means employed consists in providing the member 10 with a split sleeve 13 which embraces the hose end and is clamped thereto by a bolt 14 passing through the outturned apertured ears 15 of the sleeve 13. The member 10 is further provided with a substantially U-shaped arm 16 preferably formed integral with the sleeve 13 and which is provided at its bight portion with a vertical slot 17. The member 11 includes the key embracing portion 18 which is provided with a laterally projecting or horizontal arm 19 to which one extremity of the rack bar 12 is pivoted as at 20. The rack bar is provided on its under edge with a series of notches 21 defining teeth which engage with the lower edge of the slot 17 to couple the rack bar with the arm 16. In order to prevent accidental upward swinging movement and disengagement of the notches 21 with the lower edge of the slot 17, a keeper pawl 22 is pivoted as at 23 within the upper end of the arm 16 and is engageable at its lower free end with the ratchet teeth 24 formed on the upper edge of the rack bar 12.

In use and operation when it is desired to lock the key D to hold the valve in a closed position, the pawl 22 is swung upwardly to disengage the same from the ratchet teeth 24. The rack bar 12 is then lifted to disengage the notches 21 from the lower edge of the slot 17 and the key is turned to close the valve. With the key in this position the corresponding notch 21 is re-engaged with the lower end of the slot 17 and the pawl 22 is swung to engaging position with the ratchet teeth 24. This effectually locks the key and valve against accidental movement and prevents a small child from manipulating the key due to the complexity of the locking means. When it is desired to open the valve the locking pawl 22 is manipulated to disengage the same from the ratchet teeth 24, the rack bar 12 is lifted to disengage the notch 21 from the lower end of the slot 17, the key is turned to open the valve, and the corresponding notch 21 is engaged with the lower edge of the slot 17, after which the locking pawl is swung to locking position. Under this arrangement, which is clearly illustrated in the drawings, it will be observed that in event of accidental disconnection of the end E of the gas hose from the nozzle A which is only accomplished by movement of the same in a direction axially of the nozzle A, the rack bar 12 will exert a pull on the arm 19 which will rotate the key and valve to move the valve to its closed position.

I claim:

1. The combination with a valved outlet nozzle and a hose connected thereto, of means of connection between the hose and the valve for respectively closing the valve when opened, in event of disconnection of the hose from the outlet nozzle, and for locking the valve in closed position against accidental opening movement of the same, said means comprising a member rigidly secured to the hose, a member engaged with the valve, and interengageable adjustable connection between said members.

2. The combination with a valved outlet nozzle and a hose connected thereto, of means of connection between the hose and the valve for respectively closing the valve when opened, in event of disconnection of the hose from the outlet nozzle, and for locking the valve in closed position against accidental opening movement of the same, said means comprising a member rigidly secured to the hose and having a slot therein, a member engaged with the valve and having a radial arm, a rack bar pivotally connected to the radial arm and extending through the slotted portion with the teeth thereof engaging one end of the slot, and means for locking the teeth in engaged relation to said end of the slot.

3. The combination with a valved outlet nozzle and a hose connected thereto, of means of connection between the hose and the valve for respectively closing the valve when opened, in event of disconnection of the hose from the outlet nozzle, and for locking the valve in closed position against accidental opening movement of the same, said means comprising a member rigidly secured to the hose and having a slot therein, a member engaged with the valve and having a radial arm, a rack bar pivotally connected to the radial arm and extending through the slotted portion with the teeth thereof engaging one end of the slot, said rack bar having a set of ratchet teeth, and a locking pawl carried by the member secured to the hose for engaging said ratchet teeth to retain the rack in engaged relation to the end of the slot.

JAMES JOSEPH WALSH.